United States Patent
Bell

(10) Patent No.: US 11,043,212 B2
(45) Date of Patent: Jun. 22, 2021

(54) SPEECH SIGNAL PROCESSING AND EVALUATION

(71) Applicant: Auris Tech Limited, London (GB)

(72) Inventor: Peter Bell, Edinburgh (GB)

(*) Notice: Subject to any disclaimer, the term of this patent is extended or adjusted under 35 U.S.C. 154(b) by 0 days.

(21) Appl. No.: 16/767,961

(22) PCT Filed: Nov. 29, 2018

(86) PCT No.: PCT/EP2018/082952
§ 371 (c)(1),
(2) Date: May 28, 2020

(87) PCT Pub. No.: WO2019/106068
PCT Pub. Date: Jun. 6, 2019

(65) Prior Publication Data
US 2020/0372900 A1    Nov. 26, 2020

(30) Foreign Application Priority Data
Nov. 29, 2017  (GB) ..................................... 1719871

(51) Int. Cl.
*G10L 15/00* (2013.01)
*G10L 17/00* (2013.01)
(Continued)

(52) U.S. Cl.
CPC .......... *G10L 15/183* (2013.01); *G10L 15/083* (2013.01); *G10L 25/60* (2013.01)

(58) Field of Classification Search
CPC ..... G09B 19/04; G10L 15/083; G10L 15/183; G10L 15/187; G10L 15/193; G10L 25/60
(Continued)

(56) References Cited

U.S. PATENT DOCUMENTS

| 5,333,275 A | * | 7/1994 | Wheatley | ................ G10L 15/18 704/231 |
| 5,634,086 A | * | 5/1997 | Rtischev | ................ G09B 19/06 704/270 |

(Continued)

OTHER PUBLICATIONS

U.S. Appl. No. 16/767,961, filed May 27, 1997, Dimitry Rtischev.

*Primary Examiner* — Khai N. Nguyen
(74) *Attorney, Agent, or Firm* — RC Trademark Company

(57) ABSTRACT

There is disclosed a system that, when in operation, evaluates speech, for example evaluates a speech signal generated using a microphone to record an oral utterance. The system comprises: a user device that receives a user-defined text; and a processing unit that is operatively coupled to the user device, wherein the processing unit: refines the user-defined text to form a base text having a plurality of base text-units; defines at least one path traversing the plurality of base text-units, wherein the at least one path traverses at least one of the plurality of base text-units sequentially; receives an utterance for the user-defined text from the user device; processes the utterance to generate an interpretation text having a plurality of interpretation text-units; maps the plurality of interpretation text-units to the plurality of base text-units; assigns a score to the at least one path based on the mapped quality; identifies a traversed path from the at least one path; and calculates the assigned score associated with the traversed path to evaluate the speech.

15 Claims, 7 Drawing Sheets

(51) Int. Cl.
  *G10L 15/04* (2013.01)
  *G10L 15/183* (2013.01)
  *G10L 15/08* (2006.01)
  *G10L 25/60* (2013.01)

(58) Field of Classification Search
  USPC .................................... 704/231, 246, 251
  See application file for complete search history.

(56) References Cited

U.S. PATENT DOCUMENTS

| | | | | |
|---|---|---|---|---|
| 6,115,482 | A * | 9/2000 | Sears | G06F 3/011 348/62 |
| 6,163,768 | A * | 12/2000 | Sherwood | G10L 15/063 704/235 |
| 6,212,498 | B1 * | 4/2001 | Sherwood | G10L 15/063 704/235 |
| 6,424,943 | B1 * | 7/2002 | Sherwood | G10L 15/063 704/244 |
| 2010/0306249 | A1 * | 12/2010 | Hill | G06Q 50/01 707/769 |
| 2012/0078630 | A1 * | 3/2012 | Hagen | G09B 19/06 704/254 |
| 2012/0089400 | A1 * | 4/2012 | Henton | G10L 13/02 704/260 |
| 2014/0025366 | A1 * | 1/2014 | Georgiev | G06F 40/58 704/2 |
| 2014/0191976 | A1 * | 7/2014 | Peevers | A63F 13/40 345/173 |
| 2014/0192140 | A1 * | 7/2014 | Peevers | A63F 13/10 348/14.08 |
| 2014/0195222 | A1 * | 7/2014 | Peevers | G10L 21/003 704/201 |
| 2014/0278428 | A1 * | 9/2014 | Rolland | G10L 15/26 704/257 |
| 2017/0162203 | A1 | 6/2017 | Huang et al. | |
| 2019/0207285 | A1 | 7/2019 | Hofherr et al. | |
| 2020/0372900 | A1 * | 11/2020 | Bell | G10L 15/183 |

* cited by examiner

SPEECH SIGNAL PROCESSING AND EVALUATION

TECHNICAL FIELD

The present disclosure relates generally to speech recognition systems; and more specifically, to speech recognition systems that perform speech signal processing and recognition of a user reading from a user-defined text; optionally, the speech is captured using a microphone to generate a speech signal that is then processed to extract information included in the speech, namely to evaluate the speech, for example for using the evaluation of the speech for controlling hands-off voice-operated systems. Moreover, the present disclosure is concerned with methods of evaluating speech, for example by using aforesaid speech recognition systems. Additionally, the present disclosure relates to a computer program product comprising a non-transitory computer-readable storage medium having computer-readable instructions stored thereon, the computer-readable instructions being executable by a computerized device comprising processing hardware to execute aforementioned methods.

BACKGROUND

With advancements in technology, many portable devices, for example communication devices such as smartphones, smart watches, PDAs and likewise, are provided with voice recognition systems. These voice recognition systems are installed on the communication devices and interactively receive an audio input (namely, oral utterances for example) from a person. Furthermore, the voice recognition systems, when in operation, convert the oral utterances, namely audio input, into a corresponding text format, wherefrom a determination of corresponding words spoken is derived. Conventionally, such voice recognition systems include automatic speech recognition arrangements that convert the audio input into text. Generally, automatic speech recognition has many applications such as virtual personal assistants, voice search captioning of TV broadcasts or parliamentary proceedings, and dictation systems, but not limited thereto.

When performing voice recognition, it is known that employing an adaptation improves a performance of the voice recognition system. Such an adaptation is a mathematical process, wherein descriptive models are fine-tuned to suit nuances of a given audio input, for example due to dialect, or vocal aberrations of a person that orally generates the audio input. In particular, speaker adaptation adapts models to fit better speech characteristics, and language adaption adapts to word usage of a given speaker.

A challenge in voice recognition is that the performance of a given voice recognition system degrades when acoustic interference is present in an input speech signal provided to the given system. This acoustic interference leads to complications when performing a recognition part of a voice recognition process. For example, the acoustic interference results in at least one of:

(i) variations arising from corresponding users/speakers, for example arising from different nationalities and varying accents;
(ii) variations in delivery of same given utterances by a same given speaker/user from one occasion to another, for example due to vocal fold infection, laryngitis and so forth;
(iii) variations in speaking style from one speaker/user to another among a same given nationality; and
(iv) extraneous sounds (additive noise) received from an associated person, for example a lisp or stutter, or even arising from a split-tongue ("forked tongue") body modification.

Typically, existing voice recognition systems accommodate such variations in delivery of utterances. For example, the systems access, when in operation, databases containing many versions of a given utterance or averaged or aggregated versions of the given utterances are used by the systems when making correlations or matches. However, owing to aforementioned complexities, most known voice recognition software does not yield accurate results when analysing speech signals, and requires significant time when performing such analysis. Moreover, the known voice recognition systems are even more inefficient when it comes to recognizing utterances of children below a certain age threshold, because their voice patterns vary a lot depending upon their age, gender of the children, and the like. Furthermore, the known voice recognition systems are potentially incapable of recognizing reading mistakes and pronunciation errors, and of providing a feedback to an associated person. Additionally, a computational cost for recognizing utterances is often very high, when there are encountered aforementioned variations.

Therefore, in light of the foregoing discussion, there exist problems associated with known speech recognition systems, wherein the systems perform, for example, speech-to-text conversion.

SUMMARY

The present disclosure seeks to provide an improved speech recognition system, wherein, when in operation, the speech recognition system evaluates speech.

The present disclosure also seeks to provide a method for (of) evaluating captured speech signals.

According to a first aspect, there is provided a system that, when in operation, evaluates speech, characterized in that the system comprises:
  a user device that receives user-defined text;
  a processing unit operatively coupled to the user device, wherein the processing unit:
    refines the user-defined text to form a base text having a plurality of base text-units;
    defines at least one path traversing the plurality of base text-units, wherein the at least one path traverses at least one of the plurality of base text-units sequentially;
    receives an utterance for any arbitrary point within the user-defined text from the user device;
    processes the utterance to generate an interpretation text having plurality of interpretation text-units;
    maps the plurality of interpretation text-units to the plurality of base text-units;
    assigns a score to the at least one path based on the mapped quality;
    identifies a traversed path from the at least one path; and
    calculates the assigned score associated with the traversed path to evaluate the speech.

The present disclosure seeks to provide an improved, more efficient, more reliable system that evaluates speech; and moreover, the present disclosure seeks to provide a system that employs weighted finite state transducer-based algorithm that provide a lower latency and computational cost when performing speech recognition and speech evaluation.

It will be appreciated that "traversing sequentially the base text-units" is, for example, related to a temporal sequence in which the base text-units potentially arise in a speech utterance captured via use of a microphone and stored in data memory of a data processing arrangement.

Optionally, the processing unit comprises at least one module, wherein at least one module includes at least one of: weighted finite state transducer-based algorithms, a factor module.

Optionally, the assigned score is calculated by employing the weighted finite state transducer-based algorithm.

Optionally, the weighted finite state transducer-based algorithms are dynamically modified based on acoustic parameters and pronunciation of the user. In other words, the weighted finite state transducer-based algorithms, when being used, are potentially temporally dynamically changing in an adaptive manner.

Optionally, the acoustic parameters include at least one of: speaking accent, speaking style, pronunciation.

Optionally, the factor module refines the user-defined text by removing non-lexical punctuation and additional non-spoken content from the user-defined text.

More optionally, the processing unit deducts a penalty from the assigned score when the utterance is subject to poor acoustic parameters, for example subject to user lisp, user stuttering, extraneous external noises from a user environment, and so forth.

Furthermore, optionally, the processing unit transmits a feedback signal to the user device based on the evaluation of the speech. For example, the processing unit requests a confirmation from the user that the processing unit has made a correct interpretation of a given utterance.

Such confirmation is, for example, highly beneficial when adaptively adjusting parameters of the weighted finite state transducer-based algorithms.

According to a second aspect, there is provided a method for (of) evaluating speech, characterized in that the method comprises:
  receiving a user-defined text;
  refining the user-defined text to form a base text having a plurality of base text-units;
  defining at least one path traversing the plurality of base text-units, wherein the at least one path traverses at least one of the plurality of base text-units sequentially;
  receiving an utterance for any arbitrary point within the user-defined text;
  processing the utterance to generate an interpretation text having plurality of interpretation text-units;
  mapping the plurality of interpretation text-units to the plurality of base text-units;
  assigning a score to the at least one path based on a mapped quality;
  identifying a traversed path from the at least one path; and
  calculating the assigned score associated with the traversed path to evaluate the speech.

Optionally, the mapped quality is based on at least one of:
(i) pronunciation of the base text;
(ii) skipping a base text-unit; and
(iii) using an additional interpretation text-unit that is not present in the base text-unit.

Optionally, the traversed path is identified based on the plurality of interpretation text-units.

More optionally, the assigned score is calculated by the weighted finite state transducer based algorithm.

According to a third aspect, there is provided a computer program product comprising a non-transitory computer-readable storage medium having computer-readable instructions stored thereon, the computer-readable instructions being executable by a computerized device comprising processing hardware to execute the method of the second aspect.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In overview, embodiments of the present disclosure are concerned with an efficient and adaptable system for evaluating speech.

Figure 1:
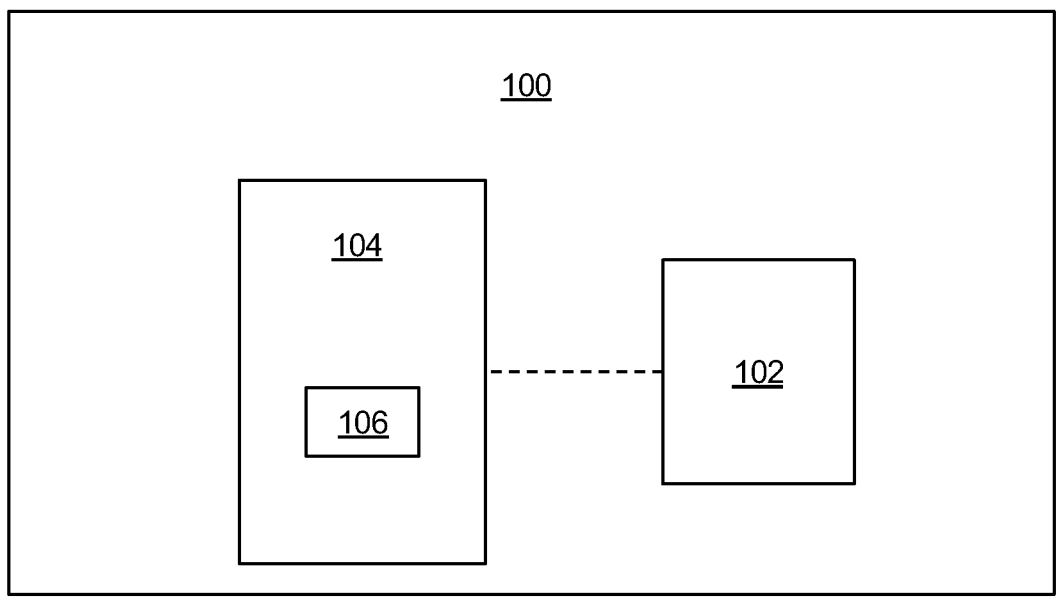
FIG. 1 is a schematic illustration of a system that performs speech recognition when in operation, in accordance with an embodiment of the present disclosure.

Referring to FIG. 1, there is shown a schematic illustration of a system 100, wherein, when in operation, the system 100 performs an evaluation of speech, in accordance with an embodiment of the present disclosure. As shown, the system comprises a user device 102 that is configured, namely arranged when in operation, to receive a user-defined text. In an embodiment, the user device 102 may be implemented in hardware, software, firmware, or a combination of these, wherein the device 102 receives, when in operation, the user-defined text. In an example, the user device 102 may store the user-defined text, for example in data memory. In one embodiment, the user device 102 may be a portable device. Examples of the user device 102 include, but are not limited to, a smart-phone, a tablet computer, and a personal digital assistant. In another embodiment, the user device 102 may be a desktop device (for example, such as a personal computer).

Throughout the present disclosure, the term "user-defined text" used herein relates to a written script having content predefined by the user; optionally, the content is predefined by a third party. In an example, the user-defined text may be a passage from a book. In another example, the user-defined text may include all contents of a book. In yet another example, the user-defined text may include all contents of plurality of books. In yet another example, the user-defined text may be any kind of textual content that the user wants to read. In yet another example, the user-defined text having any kind of textual content may be of any arbitrary length and is not limited to any character count, word count or page count. In an embodiment, the user-defined text is provided by the user. In such an embodiment, the user device 102 comprises a memory unit, for example implemented as data memory that is accessible to a data processor, wherein the memory unit is configured, namely is arranged when in operation, to store the user-defined text. In another embodiment, the user device 102 is configured, namely is arranged when in operation, to receive the user-defined text from a remote server. In such an embodiment, the user device 102 comprises a communication module that, when in operation, receives the user-defined text from the remote server.

Throughout the present disclosure, the term "communication module" relates to an arrangement of interconnected programmable and/or non-programmable components, for example hardware components such as ASICs or custom-designed digital integrated circuit hardware, that are configured, namely arranged when in operation, to facilitate data communication between one or more electronic devices, software modules and/or databases. The communication module can be software, hardware, firmware and/or a combination thereof.

As shown, the system 100 further comprises a processing unit 104 that is coupled, when in operation, to the user device 102. In an embodiment, the processing unit 104 may be hardware, software, firmware, or a combination of these that, when in operation, processes the user-defined text. Specifically, the processing unit 104 is located at a remote location. The processing unit 104 is communicably coupled, when in operation, to the user device 102 via a network. Specifically, the network may be wired, wireless, or a combination thereof. Examples of the network include, but are not limited to, Local Area Networks (LANs), Wide Area Networks (WANs), radio network, Internet®, radio networks, and telecommunication networks.

The processing unit 104, when in operation, refines the user-defined text to form a base text having a plurality of base text-units. Throughout the present disclosure, the term "base text" as used herein relates to a filtered written script, wherein non-lexical punctuation and additional non-spoken content are removed from the user-defined text; the "base text", for example, can be generated by applying rule-based processing or by using a neural network arrangement that is taught how to generate the "base text" from the user-defined text; optionally, the neural network arrangement is implemented as a deep-learning hierarchy of pseudo-analog variable state machines implemented using digital processing hardware. Optionally, the processing unit 104 comprises at least one module 106, wherein the at least one module 106 includes a factor module to refine the user-defined text by removing non-lexical punctuation and additional non-spoken content from the user-defined text. It will be appreciated that the additional non-spoken content includes, but is not limited to, page numbers, line numbers and so forth. In an example, the user-defined text depicts "The lazy old king, who got nothing done! "chocolate for breakfast", "he did command". In such an example, the processing unit 104 refines the user-defined text to remove non-lexical punctuation and additional non-spoken content therefrom to form the base text by employing the factor module. In such a case, the base text depicts "The lazy old king who got nothing done chocolate for breakfast he did command". It will be appreciated that such an manner of operation corresponds to receiving an audio oral input to generate a corresponding signal, processing the signal to convert is to corresponding text data by way of employing comparison and/or correlation processes, and then selectively filtering the text data to remove certain types of data signature therefrom to generate corresponding selectively filtered data, namely the base text depicts "The lazy old king who got nothing done chocolate for breakfast he did command", as aforementioned. The base text is then thereafter processed further, as will be described below.

Throughout the present disclosure, the term "base text-units" used herein relates to an element used to form a sentence and typically shown with a space on either side. Optionally, a plurality of base text-units is utilized to constitute the base text. As mentioned in the above example, the base text depicts "The lazy old king who got nothing done chocolate for breakfast he did command". In such an example, the words "The", "lazy", "old", "king", "who", "got", "nothing", "done", "chocolate", "for", "breakfast", "he", "did", and "command", are the plurality of base text-units. Additionally, optionally, the factor module, when in operation, recognizes complete substrings of the base text; such a recognition of sub-strings is achievable by performing a comparison or correlation against various multiple-word templates, wherein the templates are machine-generated from words that are mutually related by way of one or more grammatical rules, for example. In an example, the factor module may recognize "The lazy old king who got nothing". In another example, the factor module may recognize "nothing done chocolate for breakfast". In yet another example, the factor module may also recognize "breakfast he did command".

The processing unit 104 further, when in operation, defines at least one path traversing the plurality of base text-units, wherein the at least one path traverses at least one of the plurality of base text-units sequentially. Specifically, the factor module of the processing unit 104 is configured, namely is arranged when in operation, to define at least one path traversing the plurality of base text-units (explained below with FIG. 2). It will be appreciated that the at least one path is defined for each of the base text-units. Optionally, multiple text-paths are evaluated by the processing unit 104.

The processing unit 104 further, when in operation, receives an utterance from a given user for any arbitrary point within the user-defined text from the user device 102. In such an example case, the user device 102 is configured, namely is arranged when in operation, to receive the utterance from the given user reading the user-defined text, wherein the user can start reading from any point within the user-defined text. Throughout the present disclosure, the term "utterance for any arbitrary point within the user-defined text" as used herein relates to an audible speech sequence consisting of one or more words present anywhere in the user-defined text. Specifically, the user provides one or more audible utterances spoken into a microphone of the user device, or into a hands-free microphone or other sound-sensitive transducing apparatus. The utterance, provided by the user, is then transmitted to the processing unit 104 via the communication module of the user device 102.

The processing unit 104 processes the utterance to generate an interpretation text having a plurality of interpretation text-units. For example, the processing unit 104, when in operation, processes the utterance to extract acoustic features, and thereafter, generates an interpretation text having a plurality of interpretation text-units, wherein the interpretation text is in a digital form that is then converted to a spectral representation, for example a form of temporal Fourier harmonic spectrum, that undergoes an analysis to match the spectral representation to a written script. Throughout the present disclosure, the term "interpretation text" as used herein relates to a system readable text generated by converting the received utterance in a digital form.

It will be appreciated that the term "plurality of interpretation text-units" as used herein relates to a smallest element of the interpretation text in the digital form. In one embodiment, a plurality of interpretation text-units comprises phonemes. Throughout the present disclosure, the term "phonemes" used herein, relates to one of the units of sound that enables differentiation of different words in a language. For example, in the words 'sun' and 'bun', the phonemes /s/ and /b/ enable differentiation of the words, to enable a listener to understand the context and meaning of speech comprising the words. In one embodiment, the phonemes comprise at least one of vowel phonemes and/or consonant phonemes. For example, the phonemes may comprise vowel phonemes such as /e/, /u/ and /i/ and consonant phonemes such as /b/, /g/ and /m/. Furthermore, it is well known that the vowel phonemes have different sound energy level and/or sound harmonic elements (i.e. components) in comparison to consonant phonemes. Specifically, the vowel phonemes have a higher sound energy level than consonant phonemes. In such an example, the processing unit 104 is optionally configured, namely arranged when in operation, to identify the phonemes based on a sound energy level difference of the phonemes. For example, in the word 'tub', the difference in sound energy level of the consonant phonemes /t/ and /b/ from that of the vowel phoneme /A/ may enable identification and differentiation of the vowel phoneme /n/ from the consonant phonemes /t/ and /b/.

The processing unit 104 maps the plurality of interpretation text-units to the plurality of base text-units. Such a mapping has been shown in conjunction with FIG. 2, as elucidated in detail below. Optionally, the processing unit 104 comprises weighted finite state transducer-based algorithms. More optionally, the processing unit 104 is configured, namely arranged when in operation, to map the plurality of interpretation text-units to the plurality of base text-units by employing weighted finite state transducer-based algorithms; such algorithms are to be appreciated to be approximately akin to a form of matching or correlation. Throughout the present disclosure, the term "weighted finite state transducer-based algorithms" as used herein relates to an algorithm based on the algebraic notion of semiring. It will be appreciated that the semiring notion permits a definition of automata representations and algorithms over a broad class of weight sets and algebraic operations. Specifically, weighted finite state transducer based algorithms allows for labeling state transitions with both input and output symbols. In accordance with the present disclosure, the input symbol relates to the base text and the output symbol relates to the interpretation text. The processing unit 104 thus allows for encoding a mapping from the base text and the interpretation text, sequentially, by employing weighted finite state transducer-based algorithms. In an embodiment, the weighted finite state transducer based algorithms encapsulates the acoustic model, language model and pronunciation dictionary. In such an embodiment, the acoustic model comprises determining phonemes, the basic units of speech that distinguish one word from another. For example, the acoustic model comprises a speaking accent, a speaking style and an acoustic environment. The language model assigns a score to each possible output sentence, representing a prior probability that this sentence was spoken independently of any acoustic information. Optionally, the weighted finite state transducer based algorithms encapsulate at least one acoustic model, language model and pronunciation dictionary. In an embodiment, the language model includes a grammar model. It will be appreciated that the grammar model comprises a contiguous sequence of phonemes, syllables, letters, words or base pairs. More optionally, the grammar model dynamically changes according to acoustic parameters and pronunciation of the person, for example substantially in real-time, namely in less than a few seconds, for example in less than 5 seconds. For example, while uttering, if the person (for example, the given user) is pronouncing the word "who" as "wu-hoo", the grammar model may save the word "wu-hoo" to be determined as "who" in future; the grammar model is therefore temporally dynamically adaptable in its manner of operation. Such an implementation of the processing unit 104 is advantageous in terms of providing a faster implementation, involving less computational costs and less error-prone functioning.

Furthermore, the processing unit 104 is configured, namely is arranged when in operation, to assign a score to the at least one path based on a mapped quality. Throughout the present disclosure, the term "score" as used herein relates to allotted weights on transitions to the input and output symbols by employing the weighted finite state transducer-based algorithms. Specifically, the score to at least one path based on the mapped quality is calculated by employing a negative log probability. Optionally, the mapped quality is based on at least one of: a pronunciation of the base text, skipping a base text-unit, using an additional interpretation text-unit that is not present in the base text-unit. Optionally, the score is calculated based on probabilities, durations, penalties, or any other quantity that accumulates along at least one path to compute the overall score of mapping. Thereafter, the processing unit 104 is configured, namely is arranged when in operation, to identify a traversed path from the at least one path. Throughout the present disclosure, the term "traversed path" as used herein relates to a trail selected by the processing unit 104 based on the interpretation text. It will be appreciated that the traversed path is determined based on acoustic quality such as speaking accent, speaking style and acoustic environment. In an example, when the user is reading the user-defined text and skips a word or pronounces the word incorrectly, the processing unit 104 will select a path which correctly identifies the utterance. Specifically, the traversed path is selected based on a shortest path available for computation. In another example, the user reading the user-defined text skips a word or pronounces the word incorrectly, the processing unit 104 will select a path which correctly identifies the utterance including a skipped word or an incorrectly pronounced word. It will be appreciated that the shortest path is determined based on the assigned score to the at least one path based on the mapped quality. Such assigning of the score has been shown in conjunction with FIGS. 2-5, as elucidated in detail below.

It will be appreciated that a "path" is representative of a transition of a state within a data processing arrangement, within a data environment, wherein the paths are representative of potentially phonetic transitions occurring within a digitized capture speech signal; such a transition of state is akin to neural state transitions that occur within a human brain when listening to, and interpreting, human speech.

Furthermore, the processing unit 104 is configured, namely is arranged when in operation, to calculate the assigned score associated with the traversed path to evaluate the speech. Specifically, the assigned score of the plurality of paths present in the traversed path are computationally compounded, for example aggregated, to evaluate the speech of the user. In an example, a user utters the user defined text depicting "The lazy old king, who got nothing done! "chocolate for breakfast", he did command". In such an example, the processing unit 104 refines the user-defined text to generate a base text having a plurality of base text-units, wherein the base text depicts "The lazy old king who got nothing done chocolate for breakfast he did command". Thereafter, the processing unit 104 receives the utterance from the user device 102 and generates an interpretation text having a plurality of interpretation text-units. In such an example, if at least one of the plurality of interpretation text-units is different from the plurality of base text-units (for example, the user incorrectly speaks the above mentioned sentence, or uses wrong pronunciation, or skips a word), the processing unit 104 determines that the utterance is not consistent with the user-defined text. In such a case, the processing unit 104 may transmit a feedback to the user device 102 indicating an inconsistency in the utterance. Alternatively, if at least one of the plurality of interpretation text-units is the same as the plurality of base text-units, the processing unit 104 may transmit a signal to the user device 102 indicating the consistency. Optionally, the feedback provided by the processing unit 104 is in a form of an audio signal, a visual signal or a combination thereof. The feedback provided by the processing unit 104 is advantageous in terms of increasing, for example maximizing, the potential of the user and aids in improving performance of the user. Furthermore, the feedback also helps in analyzing the user's own performance, for example in a form of an oral self-assessment apparatus that monitors a given individual's oral performance, mutatis mutandis sports apparatus at a training centre (center) will assess a given user's athletic performance. Many such sports apparatus have been granted patent rights in both Europe, China and the USA, for example. The present disclosure can be considered to fall into such a category of invention.

Referring to FIGS. 2-5, states are represented by circles and marked with their unique number, wherein single circles represent start states, depicted as a start state 1, whilst double-circles represent possible end states, depicted as an end state 2, an end state 3, an end state 4, an end state 5, an end state 6, an end state 7, and an end state 8. Furthermore, in weighted finite state transducer notation, a transition from a previous state to a new state is represented by at least one path, depicted in form of $P_{xyz}$, wherein element 'x' represents a previous state, 'y' represents a subsequent state, and 'z' represents corresponding number of path from 'x' to 'y'.

Figure 2:
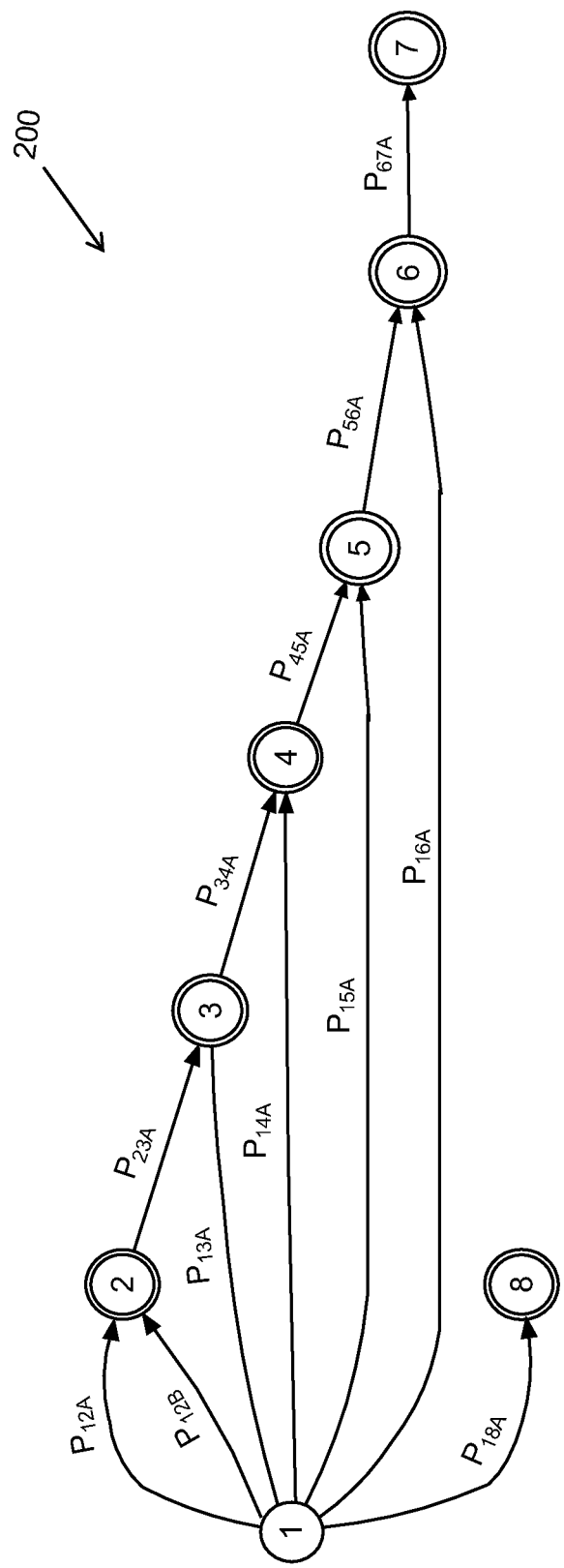
FIGS. 2-5 are exemplary implementations of a factor module based on weighted finite state transducer-based algorithms that are used in the system of FIG. 1, in accordance with an embodiment of the present disclosure, wherein the factor module employs at least one path when performing computations for executing speech processing and evaluation.

Referring to FIG. 2, there is shown an implementation of a factor module 200 based on weighted finite state transducer algorithm in a system, for example in the aforementioned system 100, in accordance with an embodiment of the present disclosure. As shown in FIG. 2, at least one path, depicted as path $P_{12A}$, $P_{12B}$, $P_{13A}$, $P_{23A}$, $P_{14A}$, $P_{34A}$, $P_{45A}$, $P_{56A}$, $P_{67A}$, $P_{15A}$, $P_{16A}$ and $P_{18A}$, traversing the plurality of base text-units is defined, wherein the at least one path $P_{12A}$, $P_{12B}$, $P_{13A}$, $P_{23A}$, $P_{14A}$, $P_{34A}$, $P_{45A}$, $P_{56A}$, $P_{67A}$, $P_{15A}$, $P_{16A}$ and $P_{18A}$, traverses at least one of the plurality of base text-units sequentially. In an example, the factor module 200 recognizes the substring depicting "old king who got nothing done" and generates a plurality of base text-units for example, such as "old", "king", "who", "got", "nothing" and "done". A processing unit (for example, such as the processing unit 104 of FIG. 1) receives the user-defined text from a user. The processing unit 104, when in operation, processes the utterance to extract acoustic features therefrom and generates an interpretation text having a plurality of the interpretation text-units. In such an example, the user correctly reads the user-defined text i.e. the interpretation text depicts "old king who got nothing done". The processing unit 104, when in operation, maps the interpretation text-units to the plurality of base text-units, by employing weighted finite state transducer based algorithms. In weighted finite state transducer notation, the mapping is represented as A: B, wherein A represents a plurality of interpretation text-units and B represent a plurality of base text-units. In such an example, the processing unit 104 maps the interpretation text-units with (namely onto) the corresponding base text-units. Therefore, in a weighted finite state transducer notation, a mapping is represented as old: old at path $P_{12A}$, king:king at path $P_{23A}$, who:who at path $P_{34A}$, got:got at path $P_{45A}$, nothing:nothing at path $P_{56A}$, and done:done at path $P_{67A}$, wherein path $P_{67A}$ represent the end state. It will be appreciated that, in this example, the paths $P_{12B}$, $P_{13A}$, $P_{14A}$, $P_{15A}$, $P_{16A}$, and $P_{18A}$ depicts that there is no input or output.

Beneficially, the factor module 200 allows the user to start reading from any point from the user-defined text. Particularly, the factor module 200 allows the user to read freely i.e. to start reading and to end reading at any arbitrary point within the user-defined text. In an example, the user starts reading "king who got nothing done". In such an example, the path $P_{12B}$ is selected to start directly the mapping from the word "king". In another example, the user starts reading "got nothing done". In such an example, the path $P_{14A}$ is selected to start the mapping directly from the word "got".

Thereafter, the processing unit is configured, namely is arranged when in operation, to assign a score to the at least one path $P_{12A}$, $P_{12B}$, $P_{13A}$, $P_{23A}$, $P_{14A}$, $P_{34A}$, $P_{45A}$, $P_{56A}$, $P_{67A}$, $P_{15A}$, $P_{16A}$ and $P_{18A}$, based on the mapping by employing the weighted finite state transducer based algorithm and identifies a traversed path, depicted as $P_{12A}$, $P_{23A}$, $P_{34A}$, $P_{45A}$, $P_{56A}$, and $P_{67A}$ from the at least one path $P_{12A}$, $P_{12B}$, $P_{13A}$, $P_{23A}$, $P_{14A}$, $P_{34A}$, $P_{45A}$, $P_{56A}$, $P_{67A}$, $P_{15A}$, $P_{16A}$ and $P_{18A}$. Optionally, the assigned score is calculated by employing the weighted finite state transducer based algorithms. Specifically, the score of the at least one path $P_{12A}$, $P_{12B}$, $P_{13A}$, $P_{23A}$, $P_{14A}$, $P_{34A}$, $P_{45A}$, $P_{56A}$, $P_{67A}$, $P_{15A}$, $P_{16A}$, or $P_{18A}$ is calculated by employing a negative log probability to determine a shortest path.

Figure 3:
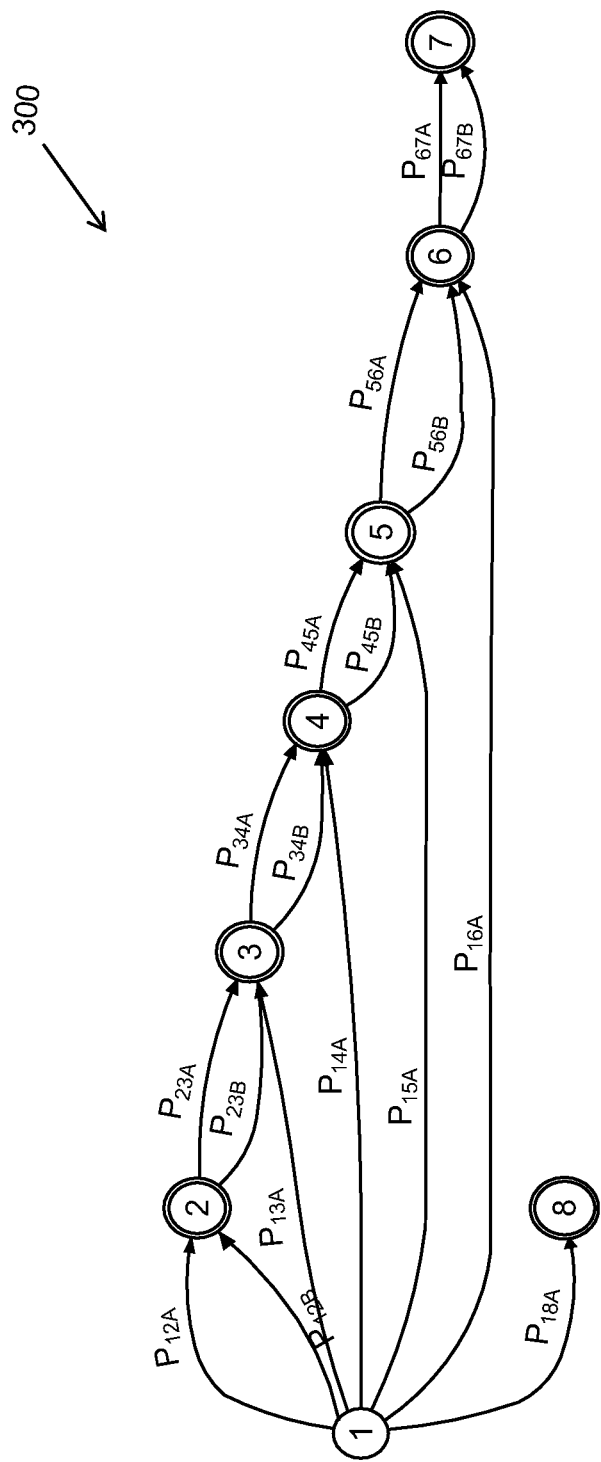

Referring to FIG. 3, there is shown an implementation of a factor module 300 based on a weighted finite state transducer algorithm in a system, for example in the system 100, in accordance with another embodiment of the present disclosure. As shown in FIG. 3, at least one path, depicted as path $P_{12A}$, $P_{12B}$, $P_{13A}$, $P_{15A}$, $P_{16A}$, $P_{23A}$, $P_{23B}$, $P_{14A}$, $P_{34A}$, $P_{34B}$, $P_{45A}$, $P_{45B}$, $P_{56A}$, $P_{56B}$, $P_{67A}$, and $P_{67B}$, traversing the plurality of base text-units is defined, wherein the at least one $P_{12A}$, $P_{12B}$, $P_{13A}$, $P_{15A}$, $P_{16A}$, $P_{23A}$, $P_{23B}$, $P_{14A}$, $P_{34A}$, $P_{34B}$, $P_{45A}$, $P_{45B}$, $P_{56A}$, $P_{56B}$, $P_{67A}$, or $P_{67B}$, traverses at least one of the plurality of base text-units sequentially.

Optionally, the processing unit is configured, namely is arranged when in operation, to deduct a penalty from the assigned score when subjected to poor acoustic parameters. More optionally, the system (for example, such as the system 100 of FIG. 1) for evaluating speech allows single word skips at any point in the text. However, to avoid skipping a large amount of words, the system deducts a skip penalty from the assigned score. Additionally, optionally, the skip penalty for each word omitted is imposed by the processing unit (for example, such as processing unit 104 of FIG. 1) by employing a weighted finite state transducer-based algorithm. In a weighted finite state transducer notation, a given mapping is represented as A:B/x, wherein A represents a plurality of interpretation text-units, B represents a plurality of base text-units and x represents the skip penalty. As elucidated above, in weighted finite state transducer notation, a mapping is represented as old:old/1 at a path $P_{12A}$, king:king/1 at a path $P_{23A}$, who:who/1 at a path $P_{34A}$, got:got/1 at a path $P_{45A}$, nothing:nothing/1 at a path $P_{56A}$, and done:done/1 at a path $P_{67A}$, wherein the path $P_{67A}$ represents the end state. In such an example, if the user skips the word "who", the path $P_{34B}$ is selected instead of the path $P_{34A}$. Moreover, the path is represented as #0: <esp>/5 in weighted finite state transducer notation, which shows that a penalty of 5 would be deducted from the assigned score. Furthermore, optionally, the system for processing and evaluating speech further deducts an insertion penalty to avoid outputting additional words. More optionally, the insertion penalty is deducted by the processing unit 104 by employing weighted finite state transducer-based algorithm. The deduction of penalty provides an advantage of helping the user to identify the user's mistakes in terms of wrong pronunciation and skipping of one or more words. Hence, deducing a penalty enforces the user to increase attentiveness while reading.

Figure 4:
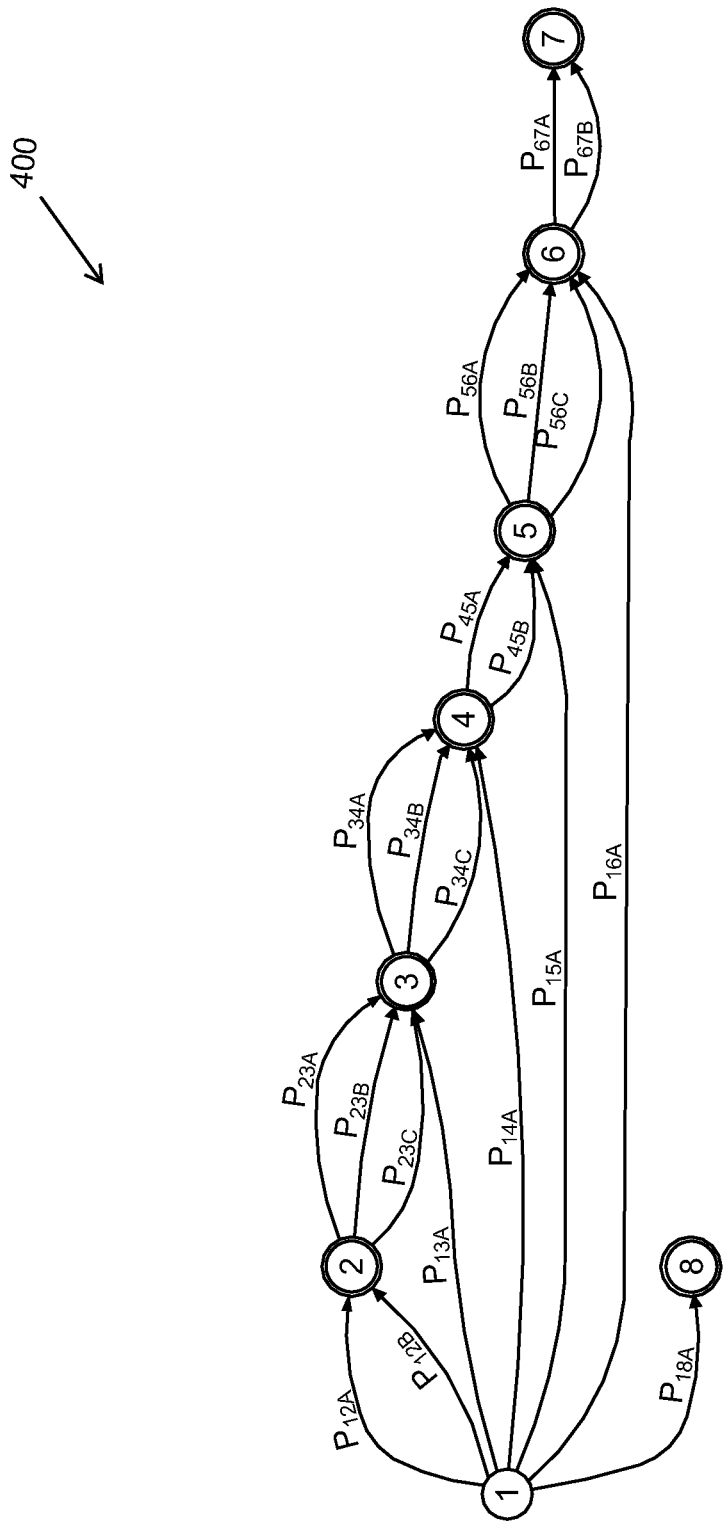

Referring next to FIG. 4, there is shown an implementation of a factor module 400 based on weighted finite state transducer-based algorithms in a system, for example in the system 100, in accordance with another embodiment of the present disclosure. As shown in FIG. 3, at least one path, depicted as path $P_{12A}$, $P_{12B}$, $P_{13A}$, $P_{15A}$, $P_{16A}$, $P_{18A}$, $P_{23A}$, $P_{23B}$, $P_{23C}$, $P_{14A}$, $P_{34A}$, $P_{34B}$, $P_{34C}$, $P_{45A}$, $P_{45B}$, $P_{45C}$, $P_{56A}$, $P_{56B}$, $P_{56C}$, $P_{67A}$ and $P_{67B}$ traversing the plurality of base text-units is defined, wherein the at least one $P_{12A}$, $P_{12B}$, $P_{13A}$, $P_{15A}$, $P_{16A}$, $P_{18A}$, $P_{23A}$, $P_{23B}$, $P_{23C}$, $P_{14A}$, $P_{34A}$, $P_{34B}$, $P_{34C}$, $P_{45A}$, $P_{45B}$, $P_{45C}$, $P_{56A}$, $P_{56B}$, $P_{56C}$, $P_{67A}$ or $P_{67B}$, traverses at least one of the plurality of base text-units sequentially.

Optionally, the processing unit 104 is configured, namely arranged when in operation, to determine reading errors caused due to different pronunciation of a word in the user-defined text. For example, the user-defined text depicts "old king who got nothing done". In such an example, the user may pronounce the word "king" as "kin-guh". In such an example, processing unit is configured to determine that the user has erroneously pronounces a silent 'g' at the end of the word "king". In this regard, the factor module 400 may define an additional path, depicted as the path $P_{23C}$. In weighted finite state transducer notation, mapping for the path $P_{23C}$ is represented as kin-guh:king/3, wherein, kin-guh represents erroneous pronunciation of the word "king", 'king' represents a base text-unit and '3' represents a penalty for erroneously pronouncing the word.

In another example, the user may pronounce the word "who" as "wu-hoo" (erroneously pronounced the silent 'w'). In such an example, the processing unit 104 is configured, namely arranged when in operation, to determine that the user has erroneously pronounces a silent 'w' at the starting of the word "who". In this regard, the factor module 400 may define an additional path, depicted as the path $P_{34C}$. In a weighted finite state transducer notation, a mapping for the path $P_{34C}$ is represented as wu-hoo:who/3, wherein, wu-hoo represents an erroneous pronunciation of the word "who", 'who represents a base text-unit and '3' represents a penalty for erroneously pronouncing the word. Similarly, in another example, the user may make a pronunciation substitution "ff" instead of "th" in "nothing". In this regard, the factor module 400 may define an additional path, depicted as the path $P_{56c}$. Optionally, such additional paths, for example such as the paths $P_{23C}$, $P_{34C}$ and $P_{56C}$ may be defined based on the speaking style, age and pronunciation of the user reading the user-defined text.

More optionally, weighted finite state transducer-based algorithms, as employed in the system 100, are dynamically modified based on acoustic parameters and pronunciation of the user. Additionally, optionally, the acoustic parameters include at least one of: speaking accent, speaking style, pronunciation. It will be appreciated that the weighted finite state transducer-based algorithms are modified by the user associated with the system for evaluating the speech. In an example, the pronunciation of a user belonging to India may be different than the pronunciation of the user belonging to Japan. Such a dynamic modification of weighted finite state transducer-based algorithms utilizing acoustic parameters and pronunciation of the user is advantageous in terms of making the system 100 adaptable and more accurate.

Figure 5:
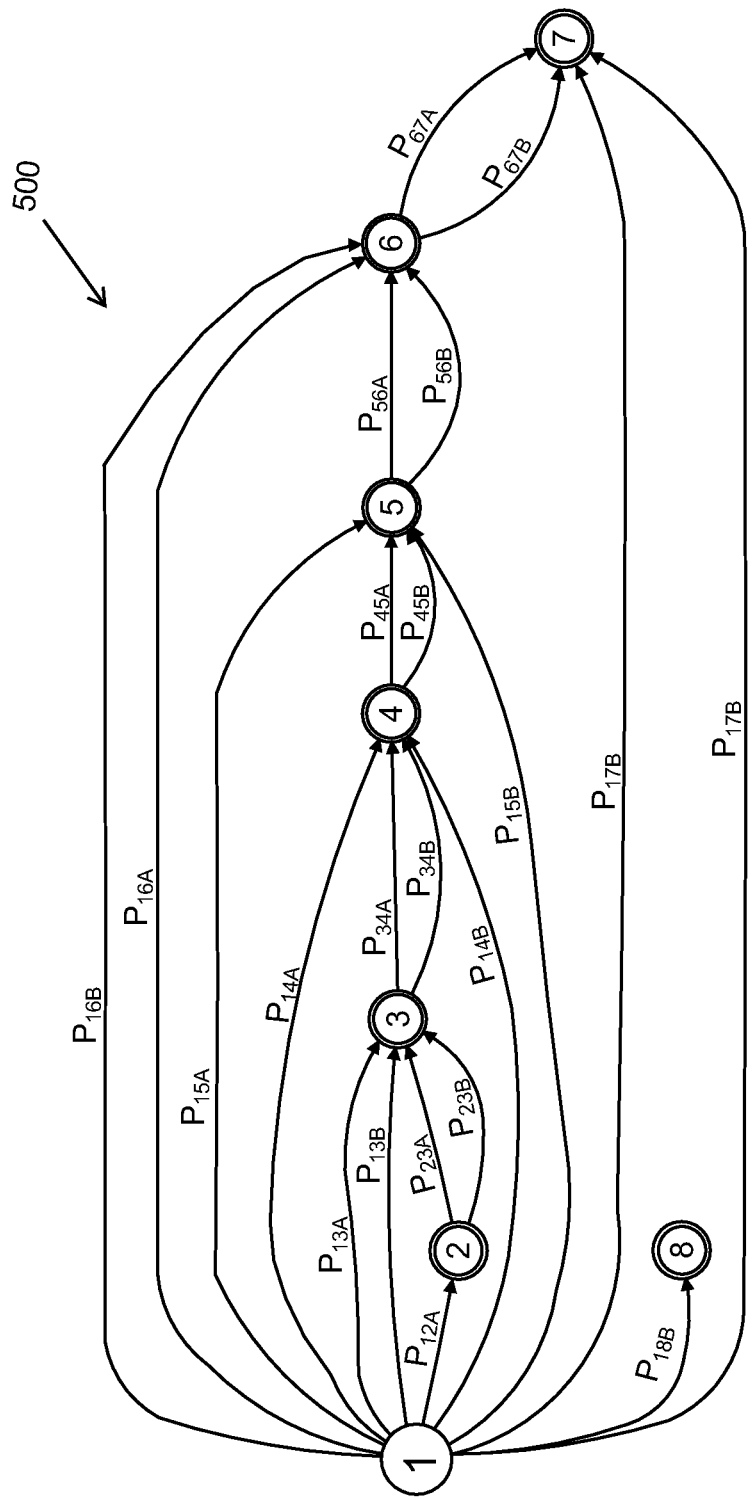

Referring to FIG. 5, there is shown an implementation of a factor module 500 based on weighted finite state transducer algorithm in a system, for example in the system 100, in accordance with another embodiment of the present disclosure. Optionally, the factor module 500 of FIG. 5 is determinised variant of the factor module 300 of FIG. 3. The determinised factor module 500 defines at least one path, depicted as paths $P_{12A}$, $P_{13A}$, $P_{13B}$, $P_{14A}$, $P_{14B}$, $P_{15A}$, $P_{15B}$, $P_{16A}$, $P_{16B}$, $P_{17A}$, $P_{17B}$, $P_{18A}$, $P_{23A}$, $P_{23B}$, $P_{34A}$, $P_{34B}$, $P_{45A}$, $P_{45B}$, $P_{56A}$, $P_{56B}$, $P_{67A}$ and $P_{67B}$, traversing the plurality of base text-units is defined, wherein the at least one $P_{12A}$, $P_{12B}$, $P_{13A}$, $P_{15A}$, $P_{16A}$, $P_{17A}$, $P_{23A}$, $P_{23B}$, $P_{14A}$, $P_{34A}$, $P_{34B}$, $P_{45A}$, $P_{45B}$, $P_{56A}$, $P_{56B}$, $P_{67A}$, $P_{67B}$, $P_{13A}$ $P_{13B}$, $P_{14A}$, $P_{14B}$ $P_{15A}$, $P_{15B}$ $P_{16A}$, $P_{16B}$, $P_{17A}$, $P_{17B}$ or $P_{18B}$, traverses at least one of the plurality of base text-units sequentially.

As elucidated above, the factor module 500 recognizes the substring depicting "old king who got nothing done" and generates a plurality of base text units for example, such as "old", "king", "who", "got", "nothing" and "done". Thereafter, the processing unit 104 is operable to process an utterance to extract acoustic features therefrom and generates an interpretation text having a plurality of the interpretation text-units. In an example, a user starts the utterance from the word "who". In such an example, a path $P_{14B}$ is provided that determines that the user is starting utterance from the word "who" without traversing through the paths $P_{12A}$ and $P_{23A}$. Similarly, in another example, if the user starts reading randomly and starts reading from the word "got". In such an example, a path $P_{15A}$ is provided that determines that the user is starting utterance from the word "got" without traversing through the paths $P_{12A}$, $P_{23A}$, $P_{34A}$.

Beneficially, the determinised factor module 500 contains at most one path matching any given utterance, thereby reducing an amount of computational resources and data memory access needed to process the utterance. Therefore, the determinised factor module 500 allows the processor unit 104 to increase a computational efficiency, for example of the system 100, by identifying a single path efficiently without any delay, for any utterance.

In an example, the determinised factor module 500 encodes a plurality of base text units in a weighted finite-state transducer form to perform recognition of all possible sub-strings of the user-defined text. Subsequently, to perform recognition and matching of the plurality of base text units with acoustic features, the processing unit 104 performs an extraction from the plurality of interpretation text units. Such matching is achieved by first composing a grammar transducer G with a lexicon finite state transducer L to form a composed LG transducer wherein, the grammar transducer G and the lexicon finite state transducer L are part of language model. The term "Composing or Composition" as used herein relates to a standard operation used with reference to finite state transducers.

The lexicon transducer L comprises standard pronunciations of one or more English encoded phonetic forms. Optionally, the lexicon transducer L may also include mispronunciations such as "kin-guh" as already elucidated with reference to FIG. 4. Such a mispronunciation may be hand-designed and suggested by various educational professionals or may be automatically inferred from utterances received from the user.

Furthermore, the composed LG transducer is then composed with a context transducer C (which is part of the language model) to form a composed CLG transducer which enables modelling of a left and a right phonetic context. Such modelling converts the acoustic representation from single phonemes to context-dependent units called triphones. The term "triphone" as used herein relates to a sequence of three phonemes. Triphones are useful in natural language processing where they are used to establish the various contexts in which a phoneme can occur in a particular natural language.

The composed CLG transducer is further composed with a transducer H (which is part of the language model) which maps context-dependent triphone units into clusters and also to states in a hidden Markov model. During acoustic processing by the processing unit 104, each possible output sentence is assigned a score by a transducer H of the composed transducer HCLG. This enables a complete acoustic matching score to be computed for all paths in the grammar transducer G, incorporating phonetic context dependency, the pronunciation lexicon and grammar relevant to language.

As described with reference to FIG. 3, the system (for example, such as the system 100 of FIG. 1) for evaluating speech allows skipping a single word at any point in the user-defined text. However, a single word skip leads to possibility of exponentially many unique paths in a weighted finite state transducer algorithm and thus, leading to prohibitive storage and memory requirements when the user-defined text is relatively large. Therefore, to overcome such a problem, the grammar transducer G is determinised prior to acknowledging single word skip paths, and composed with the lexicon transducer L, the context transducer C and the transducer H. Optionally, the processing unit 104 includes a specialized Viterbi decoder that dynamically augments the determinised transducer with possible word skip paths during mapping of interpretation text-units to the plurality of base text-units. Such dynamic augmentation of the determinised transducer and possible word skip paths helps in determining the word skip paths, that potentially provides a possibility of achieving a better score.

Figure 6:
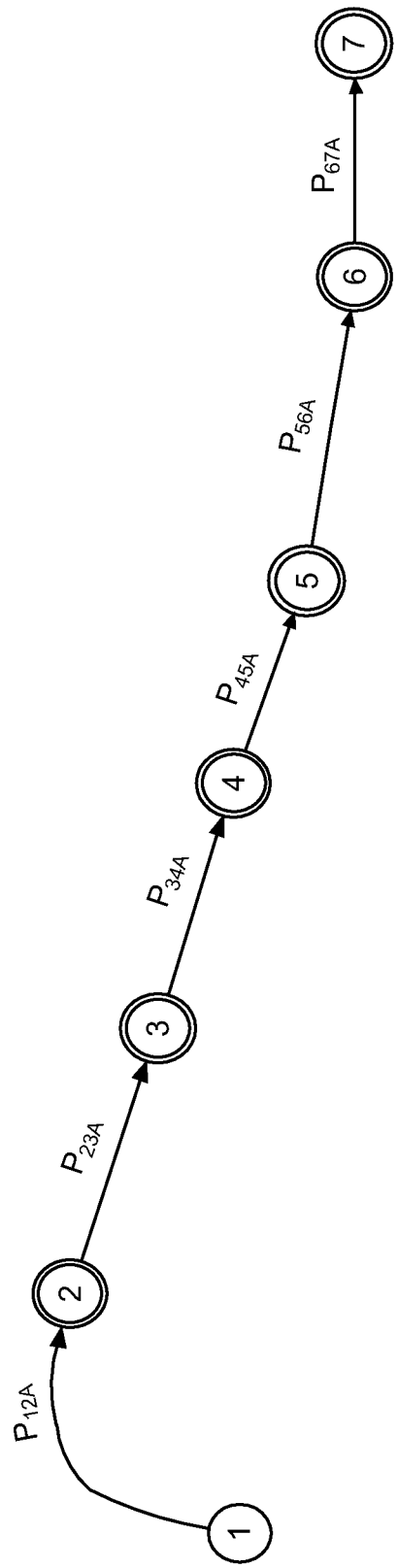
FIG. 6 is an illustration of identified traversed path from at least one path shown in FIG. 2, in accordance with an embodiment of the present disclosure.

Referring to FIG. 6, there is shown an illustration of an identified traversed path from at least one path described with reference to FIG. 2, in accordance with an embodiment of the present disclosure. Specifically, the identified traversed path is based on the plurality of interpretation text-units. As shown, if the user correctly utters the user-defined text, the processor unit 104 is configured, namely arranged when in operation, to identify the path starting from $P_{12A}$, and then to traverse through the paths $P_{23A}$, $P_{34A}$, $P_{45A}$, $P_{56A}$, and $P_{67A}$. Thereafter, the processing unit 104 is configured, namely arranged when in operation, to calculate the score of the plurality of paths through $P_{12A}$, $P_{23A}$, $P_{34A}$, $P_{45A}$, $P_{56A}$, and $P_{67A}$, by employing weighted finite state transducer based algorithms. Specifically, the score of the at least one path $P_{12A}$, $P_{23A}$, $P_{34A}$, $P_{45A}$, $P_{56A}$, and $P_{67A}$, is calculated by employing a negative log probability to determine a shortest path.

Optionally, the factor transducer reliably identifies portions of a user speech that can be used as training material to improve further the acoustic models with experience over a duration of elapsed time.

Figure 7:
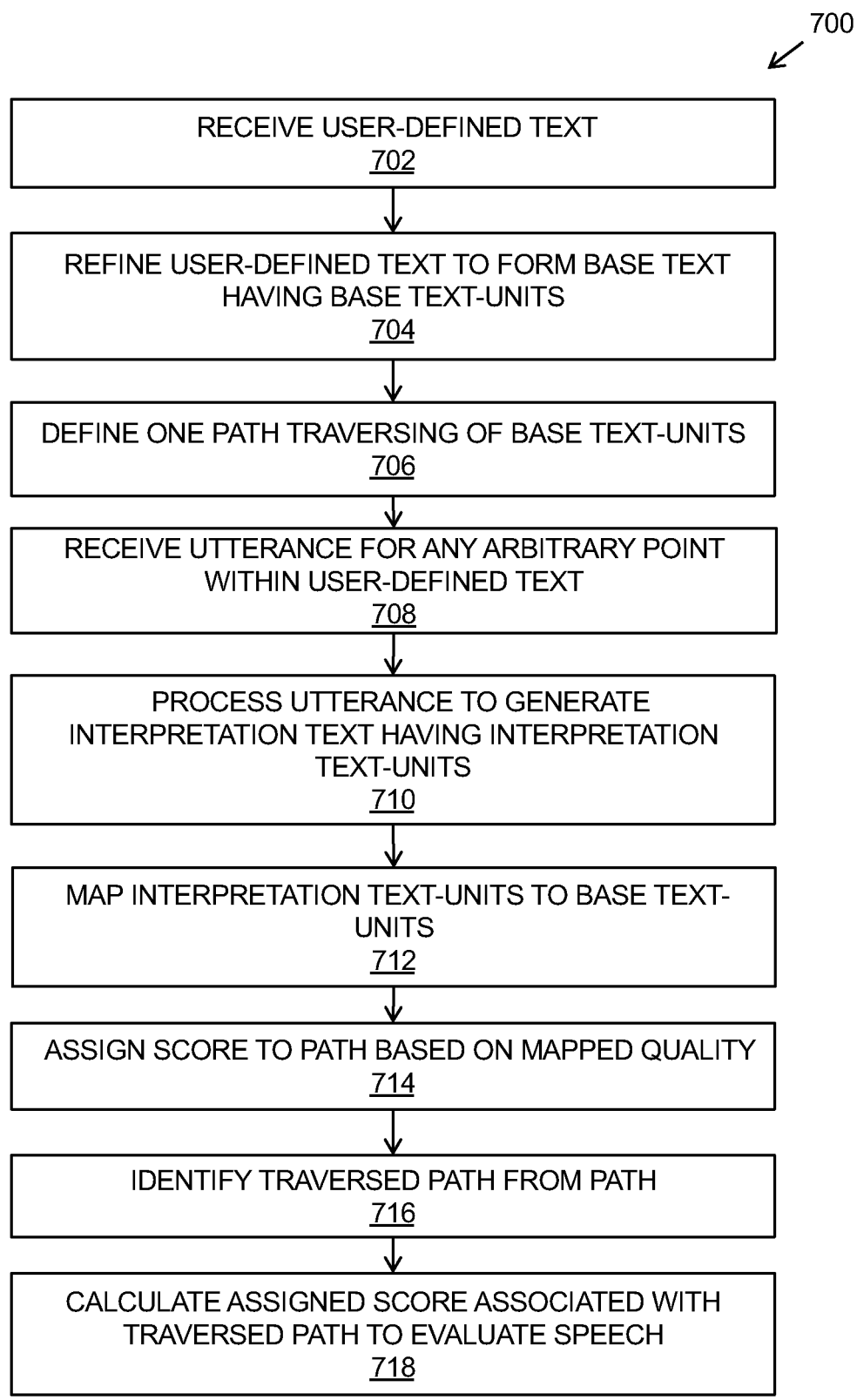
FIG. 7 is an illustration of steps of a method for using the system of FIG. 1 to implement speech recognition, for example speech processing and evaluation, of a user reading from a user-defined text, in accordance with an embodiment of the present disclosure.

Referring to FIG. 7, there is shown an illustration of steps of a method 700 for evaluating speech using a system (for example, such as the system 100 of FIG. 1). At a step 702, a user-defined text is received, for example as derived from analyzing a captured speech signal provided from a microphone. At a step 704, the user-defined text is refined to form a base text having a plurality of base text-units. At a step 706, at least one path traversing the plurality of base text-units is defined, wherein the at least one path traverses at least one of the plurality of base text-units sequentially. At a step 708, an utterance for any arbitrary point within the user-defined text is received. Thereafter, at a step 710, the utterance is processed to generate an interpretation text having plurality of interpretation text-units. Furthermore, at a step 712, the plurality of interpretation text-units are mapped to the plurality of base text-units.

At a step 714, a score is computed and then assigned to the at least one path based on a mapped quality. At a step 716, a traversed path from the at least one path is identified. Thereafter, at a step 718, an assigned score associated with the traversed path is calculated to evaluate the speech.

The steps 702 to 718 are only illustrative and other alternatives can also be provided where one or more steps are added, one or more steps are removed, or one or more steps are provided in a different sequence without departing from the scope of the claims herein. For example, in the method 700, the mapped quality is based on the pronunciation of the base text, namely by skipping a base text-unit, wherein an additional interpretation text-unit is not present in the base text-unit. Optionally, in the method 700, the traversed path is identified based on the plurality of interpretation text-units. Furthermore, optionally, in the method 700 the assigned score is calculated by the algorithm based on a weighted finite state transducer based algorithm.

The present disclosure provides an improved, more efficient and more reliable system for evaluating speech. The system reduces a search space required to be searched based on the available text and thereby allows for a continuous portion of text to be recognized by the system while also providing a low-latency computation, for example when using modest computing resources (for example, as available in a smart watch or smart phone). Since the search space is reduced, the system allows for low computational cost, as aforementioned. Furthermore, the system operates very efficiently, whilst achieving high levels of word accuracy even with relatively poor acoustic models. Beneficially, the system reliably identifies portions of users' utterances that can be used as training material to improve further the acoustic models over time that are used for implementing the system, for example the system 100.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Expressions such as "can" and "may" are used to describe optional features, unless indicated otherwise. Reference to the singular is also to be construed to relate to the plural.

The invention claimed is:

1. A system that, when in operation, evaluates speech, characterized in that the system allows for skipping a word when reading a text, wherein the system comprises:
    a user device that is configured to receive the text;
    a processing unit that is operatively coupled to the user device and comprises a module being a factor module for recognizing sub-strings, wherein the processing unit, is configured to:
        refine the received text to form a base text having a plurality of base text-units utilizing the factor module by removing non-lexical punctuation and additional non-spoken content from the received text;
        define at least one path traversing the plurality of base text units, wherein the at least one path traverses at least one of the plurality of base text-units sequentially;
        receive an utterance starting and ending at any arbitrary point within the text received by the user device;
        process the utterance to generate an interpretation text having plurality of interpretation text-units;
        map the plurality of interpretation text-units to the plurality of base text-units;
        assign a score to the at least one path based on a mapped quality;
        identify a traversed path from the at least one path, which traversed path correctly identifies the received utterance and includes any skipped words or incorrectly pronounced words; and
        calculate the assigned score associated with the traversed path to evaluate the speech.

2. The system of claim 1, characterized in that the processing unit comprises a further module, wherein the further module includes weighted finite state transducer based algorithms.

3. The system of claim 2, characterized in that the processing unit calculates the assigned score by employing the weighted finite state transducer based algorithms.

4. The system of claim 2, characterized in that the processing unit dynamically modifies the weighted finite state transducer based algorithms based on acoustic parameters and pronunciation of the user.

5. The system of claim 4, characterized in that the processing unit employs acoustic parameters that include at least one of: speaking accent, speaking style, pronunciation.

6. The system of claim 5, characterized in that the processing unit deducts a penalty from the assigned score when the text is subject to poor acoustic parameters.

7. The system of claim 1, characterized in that the processing unit transmits a feedback signal to the user device based on evaluation of a speech.

8. A method for evaluating speech, characterized in that the method allows for skipping a word when reading a text, the method comprising:
    receiving the text;
    refining the received text by removing non-lexical punctuation and additional non-spoken content from the received text to form a base text having a plurality of base text-units;
    defining at least one path traversing the plurality of base text units, wherein the at least one path traverses at least one of the plurality of base text-units sequentially;
    receiving an utterance starting and ending at any arbitrary point within the received text;
    processing the utterance to generate an interpretation text having a plurality of interpretation text-units;
    mapping the plurality of interpretation text-units to the plurality of base text-units;
    assigning a score to the at least one path based on a mapped quality;
    identifying a traversed path from the at least one path, which traversed path correctly identifies the received utterance and includes any skipped words or incorrectly pronounced words; and
    calculating the assigned score associated with the traversed path to evaluate the speech.

9. The method of claim 8, characterized in that the mapped quality is based on at least one of:
    (i) a pronunciation of the base text;
    (ii) skipping a base text-unit; and
    (iii) using an additional interpretation text-unit not present in the base text-unit.

10. The method of claim 8, characterized in that the method includes identifying the traversed path based on the plurality of interpretation text-units.

11. The method of claim 8, characterized in that the method includes calculating the assigned score by using the weighted finite state transducer based algorithm.

12. A computer program product comprising a non-transitory computer-readable storage medium having computer-readable instructions stored thereon, the computer-readable instructions being executable by a computerized device comprising processing hardware to execute a method, the method comprising:
    receiving a text;
    refining the received text by removing non-lexical punctuation and additional non-spoken content from the received text to form a base text having a plurality of base text-units;
    defining at least one path traversing the plurality of base text units, wherein the at least one path traverses at least one of the plurality of base text-units sequentially;

receiving an utterance starting and ending at any arbitrary point within the received text;

processing the utterance to generate an interpretation text having a plurality of interpretation text-units;

mapping the plurality of interpretation text-units to the plurality of base text-units;

assigning a score to the at least one path based on a mapped quality;

identifying a traversed path from the at least one path, which traversed path correctly identifies the received utterance and includes any skipped words or incorrectly pronounced words; and calculating the assigned score associated with the traversed path to evaluate the speech.

13. The computer program product of claim 12, characterized in that the mapped quality is based on at least one of:

(i) a pronunciation of the base text;

(ii) skipping a base text-unit; and (iii) using an additional interpretation text-unit not present in the base text-unit.

14. The computer program product of claim 12, characterized in that the method includes identifying the traversed path based on the plurality of interpretation text-units.

15. The computer program product of claim 12, characterized in that the method includes calculating the assigned score by using the weighted finite state transducer based algorithm.

* * * * *